(12) United States Patent
Pace

(10) Patent No.: US 9,379,655 B2
(45) Date of Patent: Jun. 28, 2016

(54) METHOD OF FIELD WEAKENING CONTROL OF PERMANENT MAGNET MOTOR DRIVERS

(71) Applicant: CANRIG DRILLING TECHNOLOGIY LTD., Houston, TX (US)

(72) Inventor: Gary Pace, Cypress, TX (US)

(73) Assignee: CANRIG DRILLING TECHNOLOGY, Houston, TX (US)

( * ) Notice: Subject to any disclaimer, the term of this patent is extended or adjusted under 35 U.S.C. 154(b) by 58 days.

(21) Appl. No.: 14/538,582

(22) Filed: Nov. 11, 2014

(65) Prior Publication Data

US 2015/0130376 A1    May 14, 2015

Related U.S. Application Data

(60) Provisional application No. 61/903,041, filed on Nov. 12, 2013.

(51) Int. Cl.
| | |
|---|---|
| H02P 6/08 | (2006.01) |
| H02P 23/14 | (2006.01) |
| H02P 21/00 | (2016.01) |

(52) U.S. Cl.
CPC .................................. *H02P 21/0089* (2013.01)

(58) Field of Classification Search
CPC ...... H02M 1/15; H02P 23/14; H02P 21/0089; H02P 21/146; H02P 6/08

USPC .................. 318/700, 400.01, 400.02, 400.07, 318/400.15, 400.23

See application file for complete search history.

(56) References Cited

U.S. PATENT DOCUMENTS

| | | | |
|---|---|---|---|
| 4,885,518 A | 12/1989 | Schauder | |
| 5,585,709 A * | 12/1996 | Jansen | .................... H02P 6/183 318/720 |
| 6,965,212 B1 | 11/2005 | Wang et al. | |
| 8,327,670 B2 * | 12/2012 | Maekawa | .............. D06F 37/304 318/701 |
| 2011/0050152 A1 | 3/2011 | Filka et al. | |
| 2013/0221885 A1 | 8/2013 | Hunter | |

OTHER PUBLICATIONS

International Search Report and Written Opinion issued International Patent Application No. PCT/US14/65051, dated Feb. 4, 2015 (8 pages).

\* cited by examiner

*Primary Examiner* — Bentsu Ro
(74) *Attorney, Agent, or Firm* — Adolph Locklar

(57) ABSTRACT

A method for field weakening control of a three phase permanent magnet AC motor in a VFD drive. The VFD drive calculates the three phase voltages to be supplied to the AC motor via a three phase inverter using feedback and feedforward calculations of quadrature and direct demand currents.

10 Claims, 2 Drawing Sheets

… (US 9,379,655 B2)

METHOD OF FIELD WEAKENING CONTROL OF PERMANENT MAGNET MOTOR DRIVERS

CROSS-REFERENCE TO RELATED APPLICATIONS

This application is a nonprovisional application which claims priority from U.S. provisional application No. 61/903,041, filed Nov. 12, 2013, which is hereby incorporated by reference in its entirety.

TECHNICAL FIELD/FIELD OF THE DISCLOSURE

The present disclosure relates to vector control of AC motors in field weakened operation.

BACKGROUND OF THE DISCLOSURE

Alternating current (AC) electric motors rely on alternating currents passed through induction windings within the stator to cause rotation of the rotor. So-called three phase AC motors include three matched sets of windings positioned radially about the stator. By supplying sinusoidal AC power to each of the sets of windings such that each set receives an alternating current offset by 120 degrees, a largely continuous torque can be imparted on the rotor as it rotates.

Unlike a brushed DC motor, output speed in an AC motor is controlled by the frequency of the current sent to the stator windings. In order to control output torque, and thus speed, a variable frequency drive (VFD) is used to vary the current fed to the AC motor. Because the inductive reactance of the stator windings is proportional to the frequency applied to the winding, increased voltage is necessary to maintain a relatively constant current within the windings, and thus a relatively constant output torque. Additionally, in a permanent magnet AC motor, the voltage caused by the magnetic field generated by the permanent magnets rotating within the stator may likewise affect the necessary supply voltage.

In order to properly drive the AC motor, VFD's often operate using one of two control methods. In a Volts/Hz control scheme, the VFD varies the output speed of the motor by supplying AC power to the stator windings at a particular frequency and voltage. For a given desired torque, voltage is proportionally related to the frequency by a so-called "voltage-to-frequency" or "volts/Hz" ratio. By using closed-loop feedback, a VFD using volts/Hz can maintain motor speed in changing conditions. This simple control scheme, however, is inherently slow in its response to rapid changes in demand speeds, as it relies on control of voltages and frequencies rather than current directly. Additionally, this simple form of volts/Hz may not be usable in a permanent magnet motor control system.

With the rapid advancement in low-cost, high speed microprocessor technology, VFDs utilizing so-called vector control or field-oriented control (FOC) models are increasingly popular. In FOC, the current supplied to the phases of the AC motor is decoupled into torque and flux components acting on the rotor in a rotating reference frame. Thus, each of these currents can be independently controlled. Current supplied to the phases of the motor are measured or derived and transformed into the torque-flux space (utilizing, for example, a Clarke/Park transformation), a closed-loop feedback model can be created to control each of these currents continuously. The processor then back-transforms the torque and flux components into three phase currents. The three phase currents are fed to a three phase inverter which outputs pulse-width modulated signals to each set of windings in the motor.

In an AC motor, even under FOC, as the speed of the permanent magnet motor is increased, the voltage generated by the fixed magnetic field (EMF) increases proportionally. At some speed, the voltage generated by the motor exceeds the maximum voltage that can be produced by the drive that is controlling the motor. If operation above this speed is desired, it is necessary to modify the current vector applied to the motor to maintain the desired torque, and control the terminal voltage of the motor to a value less than the maximum drive output voltage.

SUMMARY

The present disclosure provides for a method for field weakening control of a three phase permanent magnet AC motor having a rotor and stator driven by a three phase current generated by a variable frequency drive. The method may include inputting a target speed and a maximum drive voltage; measuring the three phase current supplied to the permanent magnet AC motor; transforming the measured three phase current signal into a two-phase signal projected onto a two-axis rotating reference frame, the phase components of the two-phase signal defining a feedback quadrature current and a feedback direct current; calculating an estimated rotor speed and estimated rotor position; calculating a speed error signal by subtracting the estimated rotor speed from the target speed; calculating, using a speed controller, a torque demand from the speed error signal; calculating a demand quadrature current using the torque demand and a demand direct current; calculating a quadrature current error signal by subtracting the feedback quadrature current from the quadrature demand current; calculating, using an Iq controller, a quadrature voltage from the quadrature current error signal; calculating the demand direct current from the maximum drive voltage, the direct voltage and the estimated rotor speed; calculating a total voltage supplied to the AC motor; calculating a voltage error signal by subtracting the total voltage supplied to the AC motor from the maximum drive voltage; calculating a field weakening offset from the voltage error signal; applying the field weakening offset to the demand direct current; calculating a direct current error signal by subtracting the feedback direct current from the demand direct current as offset by the field weakening offset; calculating, using an Id controller, a direct voltage from the direct current error signal; transforming the quadrature and direct voltages into a three phase voltage signal; modulating a DC voltage with a three phase inverter to supply three phase current to the permanent magnet AC motor.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
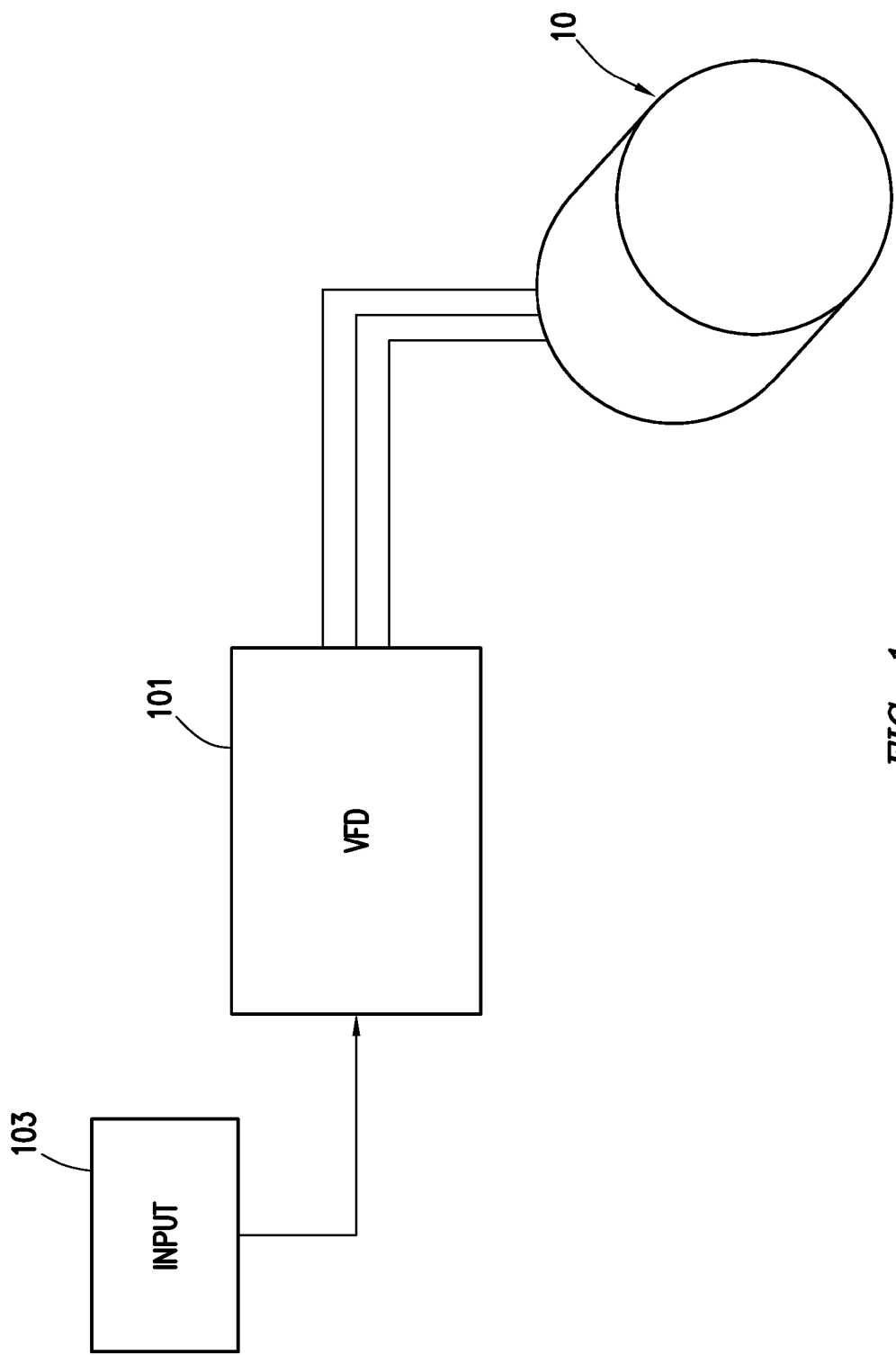
FIG. 1 depicts a block diagram of a three phase permanent magnet AC motor controlled by a FOC VFD.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a block diagram of three phase AC motor 10 controlled by VFD 101. VFD 101 may be positioned to output three phase AC power to the stator windings (not shown) of AC motor 10 in response to input parameters 103. Input parameters 103 may include, without limitation, at least one of torque demand, speed demand, and maximum drive voltage.

In the case of a permanent magnet motor, the interaction of current, flux, voltage, and speed are defined by the model voltage equation as follows:

$$\underline{v}_s = R_s \underline{i}_s + l_s \underline{\dot{i}}_s + j\omega_0 l_s \underline{i}_s + \underline{\dot{\phi}}_r + j\omega_0 \underline{\phi}_r,$$

where $\underline{v}_s$ is the stator voltage vector, $R_s$ is the stator resistance, $\underline{i}_s$ is the stator current vector, $l_s$ is the stator leakage inductance, $\underline{\phi}_r$ is the total rotor flux vector, and $\omega_0$ is the synchronous frequency given by:

$$\omega_0 = P_p \times \omega_r,$$

Where $P_p$ is the number of pole pairs per phase, and $\omega_r$ is the speed of the rotor. Total rotor flux $\underline{\phi}_r$ may be given by:

$$\underline{\phi}_r = \underline{\phi}_{pm} + \underline{L}_m \underline{i}_s,$$

where $\vec{\phi}_{pm}$ is the permanent magnet flux (the reference frame is chosen such that the permanent magnet flux is entirely real), and $\underline{L}_m$ is the mutual stator-rotor inductance. As used in the equations, "_" indicates a vector quantity, and the "·" operator is the first order time derivative.

Substituting the flux equation into the voltage equation, and the definition that $\underline{\phi}_m$ is entirely real (direct or d-axis), the voltage equation evaluates to:

$$\begin{bmatrix} v_d \\ v_q \end{bmatrix} = \begin{bmatrix} R_s + pL_d & -\omega_0 L_q \\ \omega_0 L_d & R_s + pL_q \end{bmatrix} \begin{bmatrix} i_d \\ i_q \end{bmatrix} + \begin{bmatrix} 0 \\ \omega_0 \Phi_m \end{bmatrix},$$

where p is the d/dt operator, $L_d$ is the total inductance in the d-axis, $L_q$ is the total inductance in the quadrature or q-axis, each given by:

$$L_d = (l_s + L_{dm}),$$

$$L_q = (l_s + L_{qm})$$

where $L_{dm}$ is the d-axis component of $\underline{L}_m$ and $L_{qm}$ is the q-axis component of $\underline{L}_m$.

Torque supplied by the motor may be given by:

$$T_e = 3P_p(\underline{\phi}_r \times \underline{i}_s),$$

which, from the definition that $\underline{\phi}_m$ is entirely real, can be expressed as:

$$T_e = 3P_p(\underline{\phi}_m \cdot i_q + (\underline{L}_d - \underline{L}_q)i_d i_q).$$

Thus, speed can be expressed by the following equation:

$$\overset{*}{\omega}_r = \frac{1}{(J_m + J_L)}(T_c - T_m(\omega_r) - T_L(\omega_r)),$$

where $J_m$ and $J_L$ are the motor and load inertias respectively, $T_m(\omega_r)$ is the motor loss torque as a function of speed, and $T_L(\omega_r)$ is the load torque as a function of speed.

The voltage and flux equations can thus be combined into the following extended state-space format:

$$\begin{bmatrix} \overset{*}{i}_d \\ \overset{*}{i}_q \end{bmatrix} = \begin{bmatrix} \left(\frac{-R_s}{L_d}\right) & \left(\omega_0 \frac{L_q}{L_d}\right) \\ \left(-\omega_0 \frac{L_d}{L_q}\right) & \left(\frac{-R_s}{L_q}\right) \end{bmatrix} \begin{bmatrix} i_d \\ i_q \end{bmatrix} + \begin{bmatrix} \left(\frac{V_d}{L_d}\right) \\ \left(\frac{V_q - \omega_0 \phi_m}{L_q}\right) \end{bmatrix}.$$

Figure 2:
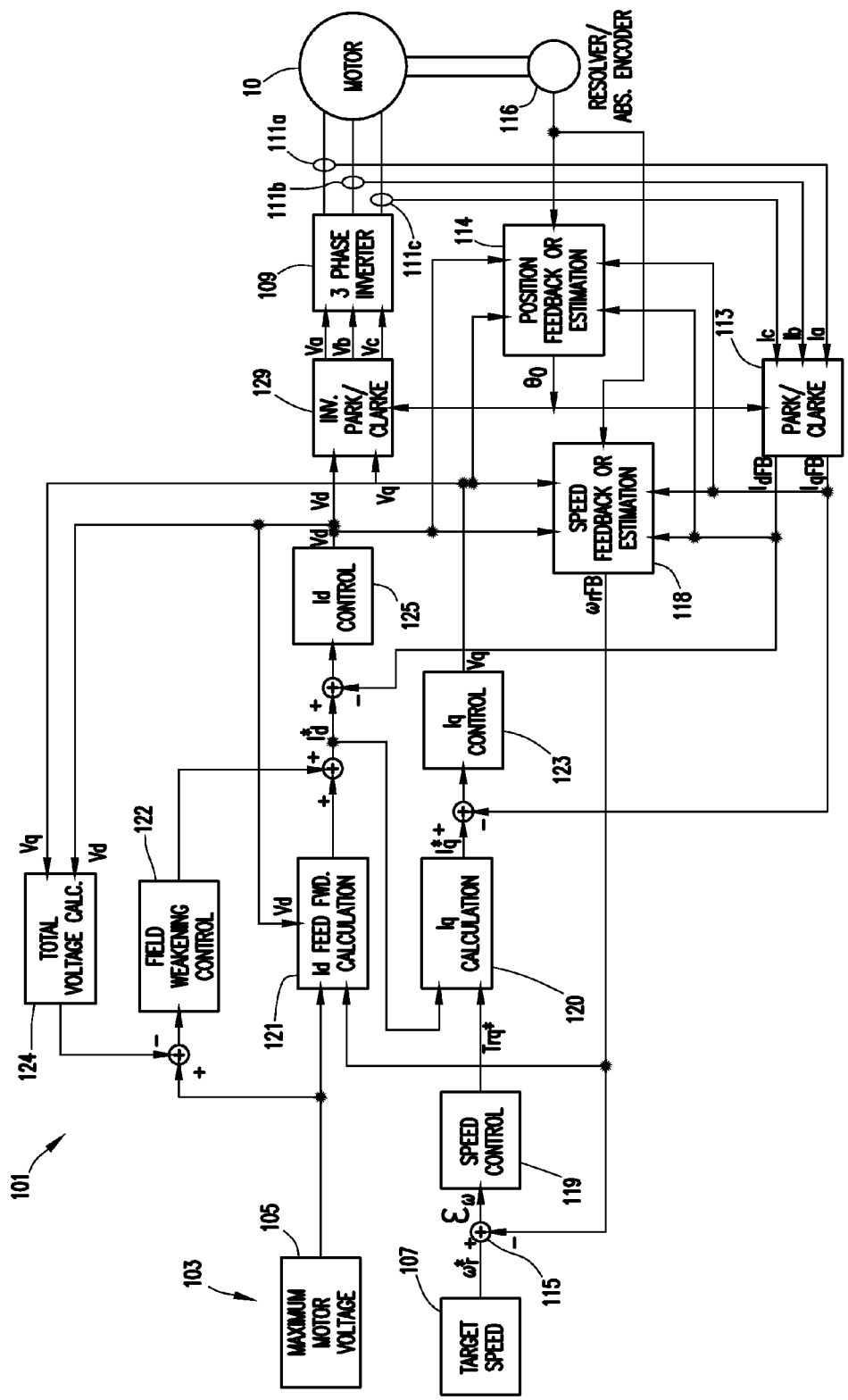
FIG. 2 depicts a block diagram of a FOC VFD consistent with embodiments of the present disclosure.

FIG. 2 depicts a block diagram of VFD 101 of FIG. 1. In this embodiment, input parameters 103 shown are maximum drive voltage 105 and target speed 107. Maximum drive voltage 105 may be, as the name suggests, the maximum voltage available to VFD 101 to output to AC motor 10. Since AC motor 10 is driven by PWM signals from three phase inverter 109, maximum drive voltage 105 is a DC voltage.

As VFD 101 drives AC motor 10, VFD 101 measures the currents $i_a$, $i_b$, $i_c$ supplied to each of the stator windings phases using ammeters 111*a-c*. In some embodiments wherein AC motor 10 is ungrounded and supplied with balanced three phase currents, the current supplied to one of the three windings may be derived from measurements of the other two windings. The three current signals $i_a$, $i_b$, $i_c$ are transformed into a two-phase projection of the currents in a rotating reference frame, namely feedback quadrature current $i_{q\_FB}$ and feedback direct current $i_{d\_FB}$. This transformation may be accomplished by, for example, Park/Clarke transformation 113. Park/Clarke transformation 113 uses estimated position $\theta_0$ generated by position estimator 114. Position estimator 114 may calculate estimated position $\theta_0$ from a signal generated by resolver/encoder 116, which may be attached to the output shaft of AC motor 10.

The signal generated by resolver/encoder may also be used by speed estimator 118 to calculate estimated rotor speed $\omega_r$. In other embodiments, the two-phase projected currents may be used to calculate estimated position $\theta_0$ and rotor speed $\omega_r$. In other embodiments, two-phase projected currents in a stationary reference frame as calculated by a Clarke transformation alone may be used to calculate estimated position $\theta_0$ and rotor speed $\omega_r$.

Furthermore, in some embodiments, one or more of position estimator 114 and speed estimator 118 may incorporate feedback into the position and rotor speed calculations. In such embodiments, parameters including but not limited to direct voltage $v_d$, quadrature voltage $v_q$, feedback direct current $i_{d\_FB}$, and/or feedback quadrature current $i_{q\_FB}$ (as discussed below) may be utilized in the estimation of estimated position $\theta_0$ and rotor speed $\omega_r$.

Rotor speed $\omega_r$ is subtracted from target speed 107 at 115 to generate a speed error signal $\epsilon_\omega$ which may be used by speed controller 119 to generate a torque demand Trq*, which is subsequently used by $I_q$ calculator 120 to calculate demand quadrature current $i_q$*. Quadrature current can be described as the current which induces the component of the stator magnetic field separated by 90 degrees from the rotor. Likewise, direct current can be described as the current which induces the component of the stator magnetic field aligned with the rotor. Thus, the quadrature component generally has a greater effect on rotor torque than the direct component. However, the direct component may contribute to torque in, for example, salient machines where $L_d$ and $L_q$ are significantly different. Thus demand direct current $i_d^*$ may also be taken into account by $I_q$ calculator 120 in determining demand quadrature component $i_q^*$.

Feedback quadrature current $i_{q\_FB}$ is subtracted from demand quadrature current $i_q^*$, and the calculated error may be fed into $I_q$ controller 123. $I_q$ controller 123, which may operate as a PI controller or "bang-bang" controller as understood in the art, thus calculates quadrature voltage $v_q$, i.e. the quadrature component of the voltage to be supplied to AC motor 10.

In a similar manner, $I_d$ feed forward calculator 121 generates a demand direct current $i_d^*$. In typical operation, it may be desired to maintain demand direct current $i_d^*$ at zero since maximum torque results from a magnetic field aligned 90 degrees offset from the rotor. However, in order to operate AC motor 10 at, for example, high rotor speeds at which back EMF is high, $i_d^*$ may be set below zero to reduce rotor flux, or in the case of a permanent magnet motor, to oppose the magnetism of the permanent magnets of the rotor. To do so, embodiments of the present disclosure include field weakening control 122 to calculate an offset which is applied to the output of $I_d$ feed forward calculator 121 to determine demand direct current $i_d^*$. Total voltage calculation 124 may calculate the total voltage supplied to AC motor 10 (as calculated from direct voltage $v_d$ and quadrature voltage $v_q$ as discussed below). Field weakening control 122 may use the difference between maximum drive voltage 105 and the total voltage to calculate the offset.

$I_d$ feed forward calculator 121 calculates demand direct current $i_d^*$ first by finding the feed forward voltage $v_{q,ff}$ according to:

$$v_{q,ff} = \sqrt{v_{lim}^2 - v_d^2}$$

where $v_{q,ff}$ is the feed forward voltage, $v_{lim}$ is maximum drive voltage 105, and $v_d$ is the direct voltage as discussed below. Demand direct current $i_d^*$ may then be calculated using the following equation derived from the model of AC motor 10 above:

$$i_d^* = \frac{v_{q,ff} - \sqrt{3}\,\omega_0 \phi_m}{\sqrt{3}\,\omega_0 L_d}.$$

As previously discussed, demand direct current $i_d^*$ may then be offset by the output of field weakening control 122. In some embodiments, demand direct current $i_d^*$ and the offset calculated by field weakening control 122 may be weighted differently. Feedback direct current $i_{d\_FB}$ is then subtracted from demand direct current $i_d^*$ to generate an error to be fed into $I_d$ control 125. $I_d$ control 125, which may operate as a PI controller or "bang-bang" controller as understood in the art, then generates direct voltage $v_d$.

Direct and quadrature voltages $v_d$, $v_q$ are then reverse transformed by inverse Park/Clarke transformation 129 from the rotating reference frame to the three phase voltages $v_a$, $v_b$, $v_c$. The three phase voltages $v_a$, $v_b$, $v_c$ are fed into three phase inverter 109, which using, for example, PWM, modulates the supplied DC voltage into AC current to AC motor 10.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions and alterations herein without departing from the spirit and scope of the present disclosure.

The invention claimed is:

1. A method for field weakening control of a three phase permanent magnet AC motor having a rotor and stator driven by a three phase current generated by a variable frequency drive, the method comprising:
    inputting a target speed and a maximum drive voltage;
    measuring the three phase current supplied to the permanent magnet AC motor;
    transforming the measured three phase current signal into a two-phase signal projected onto a two-axis rotating reference frame, the phase components of the two-phase signal defining a feedback quadrature current and a feedback direct current;
    calculating an estimated rotor speed and estimated rotor position;
    calculating a speed error signal by subtracting the estimated rotor speed from the target speed;
    calculating, using a speed controller, a torque demand from the speed error signal;
    calculating a demand quadrature current using the torque demand and a demand direct current;
    calculating a quadrature current error signal by subtracting the feedback quadrature current from the quadrature demand current;
    calculating, using an $I_q$ controller, a quadrature voltage from the quadrature current error signal;
    calculating the demand direct current from the maximum drive voltage, the direct voltage and the estimated rotor speed;
    calculating a total voltage supplied to the AC motor;
    calculating a voltage error signal by subtracting the total voltage supplied to the AC motor from the maximum drive voltage;
    calculating a field weakening offset from the voltage error signal;
    applying the field weakening offset to the demand direct current;
    calculating a direct current error signal by subtracting the feedback direct current from the demand direct current as offset by the field weakening offset;
    calculating, using an $I_d$ controller, a direct voltage from the direct current error signal;
    transforming the quadrature and direct voltages into a three phase voltage signal; and
    modulating a DC voltage with a three phase inverter to supply three phase current to the permanent magnet AC motor.

2. The method of claim 1, wherein the demand direct current comprises a field weakening component and a feed forward component, the field weakening component calculated by a field weakening controller, and the feed forward component is calculated by the following formulae:

$$v_{q,ff} = \sqrt{v_{lim}^2 - v_d^2}$$

$$i_d^* = \frac{v_{q,ff} - \sqrt{3}\,\omega_0 \phi_m}{\sqrt{3}\,\omega_0 L_d},$$

where $v_{q,ff}$ is a feed forward voltage, $v_{lim}$ is the maximum drive voltage, $v_d$ is the direct voltage, coo is the estimated rotor speed, $\phi_m$ is a permanent magnet flux, $L_d$ is a total inductance in the d-axis, and $i_d^*$ is the feed forward component of the demand direct current.

3. The method of claim 1, wherein the measured three phase signal is projected onto a two-axis rotating reference frame by a Park/Clarke transformation.

4. The method of claim 1, wherein the $I_q$ controller and the $I_d$ controller operate as PI controllers.

5. The method of claim 1, wherein the three phase inverter supplies a pulse-width modulated current to each phase of the permanent magnet AC motor.

6. The method of claim 1, wherein the three phase current is measured by ammeters positioned to detect current in each of the three phases of current supplied to the permanent magnet AC motor.

7. The method of claim 1, wherein the three phase current is measured by ammeters positioned to detect current in two of the three phases of current supplied to the permanent magnet AC motor, and the current in the third phase is calculated from the other two currents.

8. The method of claim 1, wherein the estimated rotor speed and the estimated rotor position are calculated from a resolver or an encoder coupled to an output shaft of the permanent magnet AC motor.

9. The method of claim 1, wherein the estimated rotor speed and the estimated rotor position are calculated from the measured three-phase current signal.

10. The method of claim 9, wherein the estimated rotor speed and the estimated rotor position are calculated further using the quadrature and direct voltages, and the feedback quadrature and direct currents.

\* \* \* \* \*